Aug. 3, 1926. 1,594,899
E. FETTER
FLUID PRESSURE BRAKE
Filed Jan. 4, 1926 2 Sheets-Sheet 2

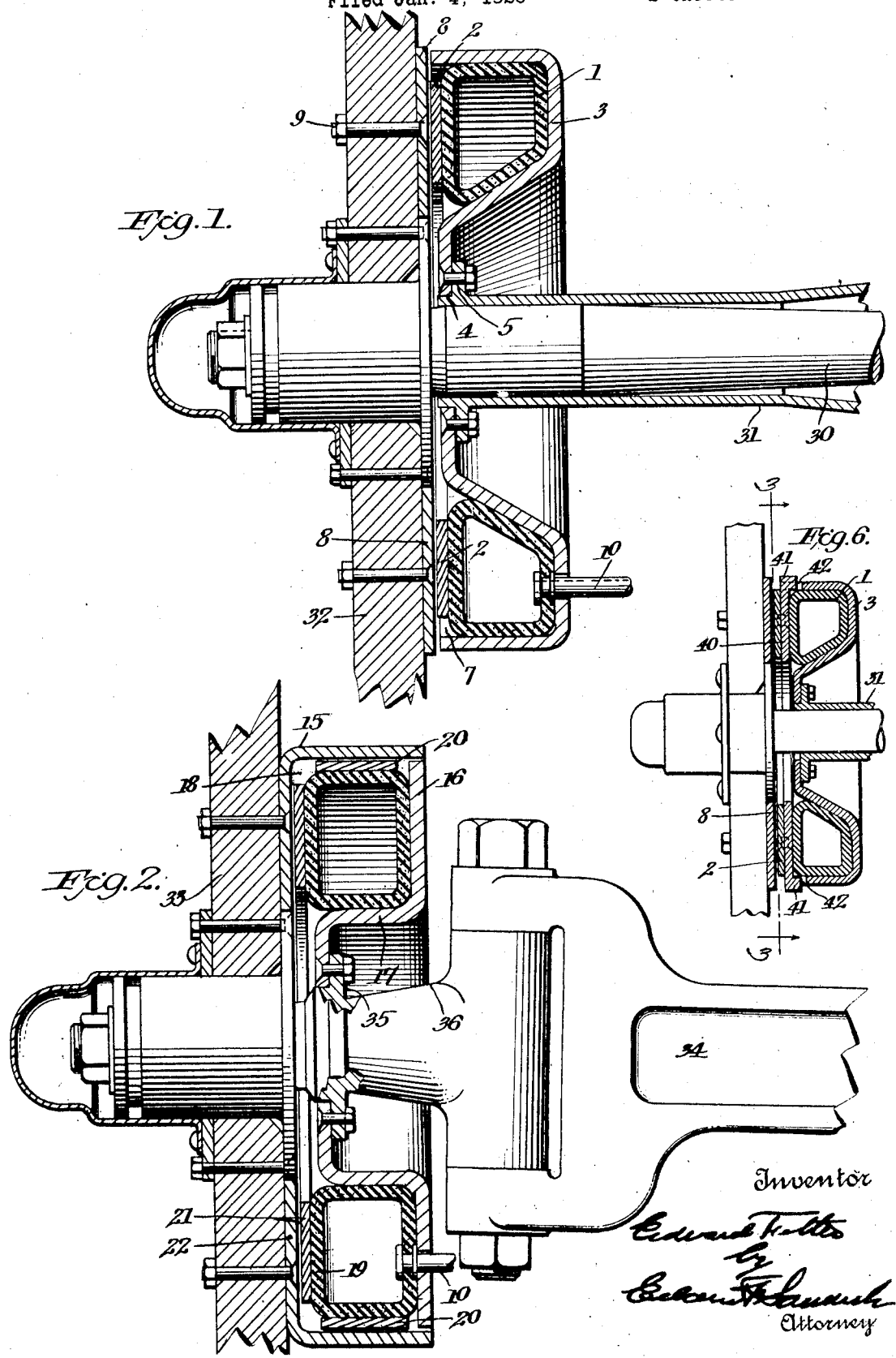

Inventor
Edward Fetter
by
Attorney

Patented Aug. 3, 1926.

1,594,899

UNITED STATES PATENT OFFICE.

EDWARD FETTER, OF BALTIMORE, MARYLAND.

FLUID-PRESSURE BRAKE.

Application filed January 4, 1926. Serial No. 79,216.

The fluid pressure or hydraulic brakes now in use on motor vehicles are of the type in which an ordinary brake band is tightened by means of a hydraulic piston working in a cylinder. Such brakes are uncertain in their operation on account of the difficulty in preventing leakage around the pistons.

The present invention relates to a fluid pressure brake, either liquid or gas actuated, which is not subject to this difficulty.

The fluid pressure brake which is the subject of the invention also has the advantage that it may be applied without any considerable change of the axle and wheel structure, and in some instances may even be substituted on a machine already equipped for the present existing types of mechanical and hydraulic brakes, being applied directly to the brake drum.

Described in general terms, it consists of a flexible container which is placed between a stationary member on the axle and a rotary member on the wheel, the braking pressure being applied between the two said members by increasing the fluid pressure on the inside of the flexible container or bag.

In the preferred form of the invention this flexible container or bag is in the form of an annular pad made of fabric and rubber, very much after the manner of a single tube tire, or it may be made in the form of an outer casing and an inner tube as is the present pneumatic tire for automobiles and to increase the life of the bag to correspond to that of the present commercial brake lining the bag is provided with a suitable wear-resisting surface.

In the accompanying drawing I have illustrated a fluid pressure brake embodying the features of my invention in the preferred form.

In the drawing—

Figure 1 is a vertical section taken through the axis of the rear wheel of a motor vehicle equipped with a brake in accordance with my invention, the outer portion of the wheel being broken away for convenience.

Figure 2 is a similar view showing a slightly different form of the brake applied to the front wheel of a motor vehicle.

Fig. 6 shows a modification.

Figure 5:
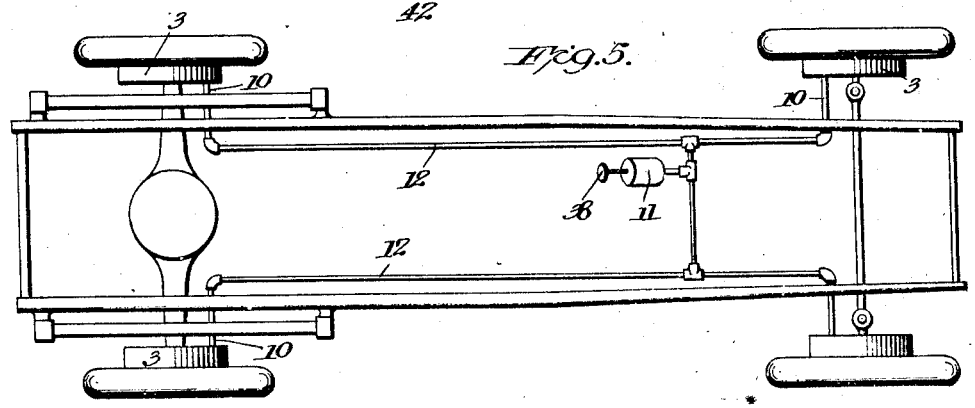
Figure 5 is a diagrammatic plan of the chassis of a motor vehicle equipped with a brake system in accordance with the invention.

Referring to the drawings by numerals, each of which is used to indicate the same or similar parts in the different figures, the brake, as shown, in Figure 1 consists of an annular flexible container or bag 1 which as aforesaid may be similar to a pneumatic tire of either the single or double tube type, the form in Figure 1 being a single tube. This annular bag or container has secured to one circular face a ring 2 of any suitable brake lining material which provides a suitable wear-resisting surface, and the bag is enclosed within an annular housing 3 which has a central opening 4 for the rear axle and is secured about the opening to a flange or shoulder 5 on the axle, so that the annular housing 3 is stationary relatively to the rear axle. This annular housing 3 is open as to one circular face at 7 where the brake lining 2 is exposed and the wheel is provided as to the portion opposite the brake lining with a corresponding flat ring or wear plate 8 secured thereto in any suitable manner as by means of bolts 9. The flexible container or bag 1 is provided with a pipe connection 10 connected to the actuating cylinder 11 by pipes 12 as shown in Figure 5 or it may be connected to any means for supplying fluid under pressure in any suitable manner. When fluid under pressure is introduced into the bag by way of the pipe 10, the latter is expanded and applies to the wear plate 8, a pressure corresponding to the pressure per square inch thus introduced, multiplied by the area of the contacting surfaces of the lining 2 and the plate 8.

The brake illustrated in Figure 2 is of somewhat different construction. The wheel is provided with the usual type of brake drum 15 secured to the wheel in any suitable manner and rotated therewith, and there is a co-operating flange 16 secured to the axle and therefore stationary. This flange 16 has an annular shoulder or offset 17 so that the brake drum and the flange form an annular housing 18. In this housing is an annular flexible container or bag 19 which may have brake linings or other wear resisting surfaces 20 and 21 or either of them shown in the form of brake linings secured to the bag, the lining 20 bearing outwardly against the inner cylindrical surface of the brake housing and the lining 21 bearing against the flat disk-like member 22 which may be referred to as the bottom of the brake drum, it being understood that while this brake lining has been referred to as bearing against the adjacent surfaces, it is normally spaced away from these surfaces and only brought in contact with them when fluid under excess pressure is introduced into the bag for braking purposes. This bag or container 19 has a pipe connection 10 as already described, which may be connected to the pipes 12, Figure 5, or to any suitable pressure generating system for applying the brakes.

Figure 4:
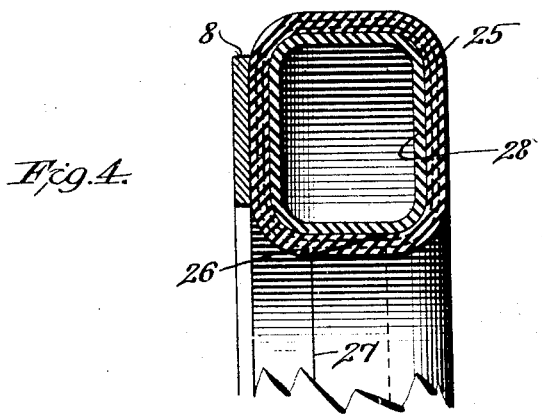
Figure 4 is a fragmentary cross-section corresponding to Figures 1 and 2, the same being on a radial plane including the axis showing a flexible container or bag for this type of brake, having instead of the single tube an outer casing and an inner tube.

In Figure 4 a slightly different form of bag or flexible container is shown, the same being in the form of an outer rubber and fabric or similar suitable flexible casing 25 split as to the inner circumferential portion of the wall 26, the split 27 being in the plane of a conic frustum, so that the edges are tapered and overlap as illustrated, this being merely the preferred form of the invention and capable of wide variation. This casing 25 is supplied with an inner tube 28 similar in construction and operation to the inner tubes of pneumatic tires now generally used on motor vehicles.

The rear axle shaft 30 and housing 31 have for convenience been referred to herein as the rear axle. The rear wheel is indicated by reference character 32, the front wheel 33 and the front axle 34, the brake drum in this instance being secured to a flange 35 on the spindle 36.

In the form of the invention shown, for purposes of illustration, pressure may be generated by means of a cylinder 11 having a piston therein not shown which is pressed downwardly for the purpose of generating pressure and operating the brake by means of a foot pedal 38, the piston being returned to normal position by a spring or other suitable means not shown and as already outlined. The pressure for actuating the brakes may be generated in any suitable manner, the requisite condition being that fluid under pressure may be introduced into the flexible containers or bags at the will of the operator. The operation of the device has been fully described in connection with the description of the structure. The diagram Fig. 5 illustrates established practice.

Figure 6 is a view corresponding to Figures 1 and 2 but showing a modified form of brake in which the friction and tension of braking are taken off of the bag. The structure in Figure 6 is like that of Figure 1, and the parts correspond and are similarly indicated.

Figure 3:
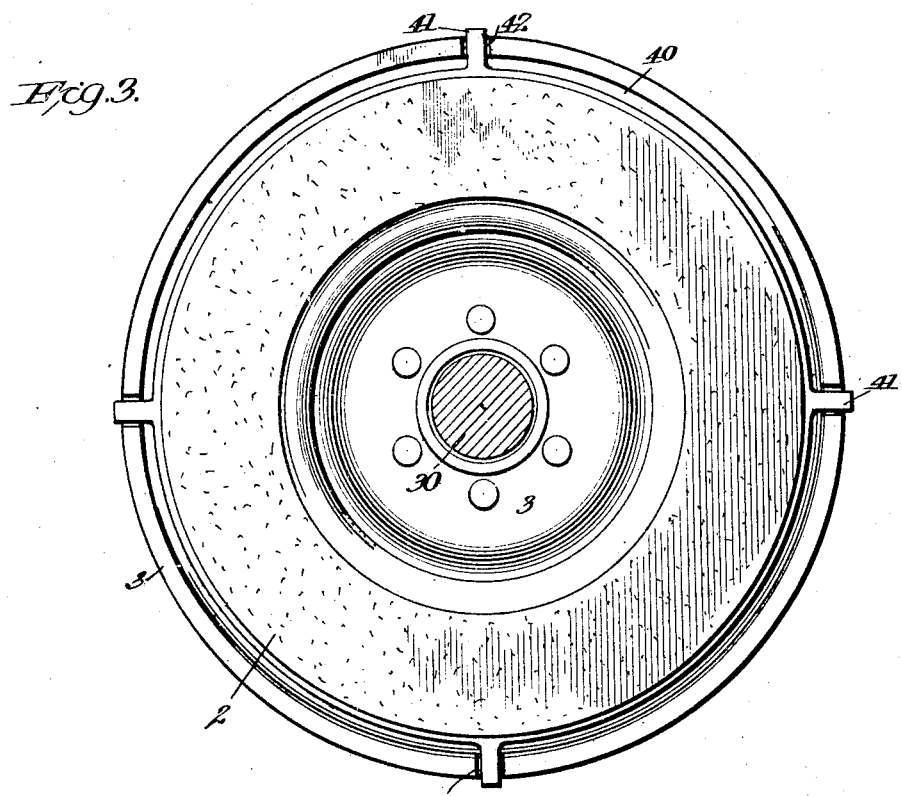
Figure 3 is a section through the rear axle on the line 3—3 of Figure 6 looking in the direction of the arrow and showing a modified form of the invention, the brake member and drum appearing in elevation.

The variation incident to the modification consists of a flat metal ring 40 having radially projecting keys 41 spaced around its peripheral edge, said keys sliding in slots 42 in the stationary casing 3, said slots being parallel to the axis, so that the ring is normally stationary relatively to the axle housing or other fixed portion of the machine 31 but free to move in the direction of the axis and into contact with the disk 8 which is secured to the wheel or other rotary member. Any suitable brake lining 2 may be placed between the disk 8 and the flat ring 40. Fig. 3 also shows the keys 41 and slots 42 and ring 40.

When fluid under pressure is introduced into the bag, the expansion of the bag presses the brake ring 40 against the disk 8, setting up a braking friction between the stationary ring 40 and the rotating disk 8, but the torque of braking is taken up by the keys 41 and hence the bag is relieved of all stresses except that incident to expansion under fluid pressure.

I have thus described specifically and in detail a fluid pressure brake embodying my invention in slightly different forms, in order that the nature and operation of the same may be clearly understood; however, the specific terms herein are used descriptively rather than in a limiting sense, the scope of the invention being defined in the claims.

What I claim and desire to secure by Letters Patent is:—

1. A vehicle brake member comprising an annular flexible bag having an outer shoe and an inner tube.

2. A vehicle brake comprising two separate and relatively movable members, one of said members being secured to a rotary portion of the vehicle, the other said member being secured to a relatively stationary portion of the vehicle, a flexible container enclosed between said members, and means for introducing fluid under pressure into said container at the will of the operator of the vehicle, the container being stationary relatively to the vehicle, said container being in the form of a fabric and rubber bag, having a wear-resisting surface.

3. A motor vehicle brake element comprising a flexible bag adapted to be inflated, and a brake lining secured to the bag.

Signed by me at Baltimore, Maryland, this 23rd day of December, 1925.

EDWARD FETTER.